July 2, 1963   E. R. BILLINGTON   3,095,899
LIQUID OUTAGE CONNECTION
Original Filed May 5, 1958   3 Sheets-Sheet 1
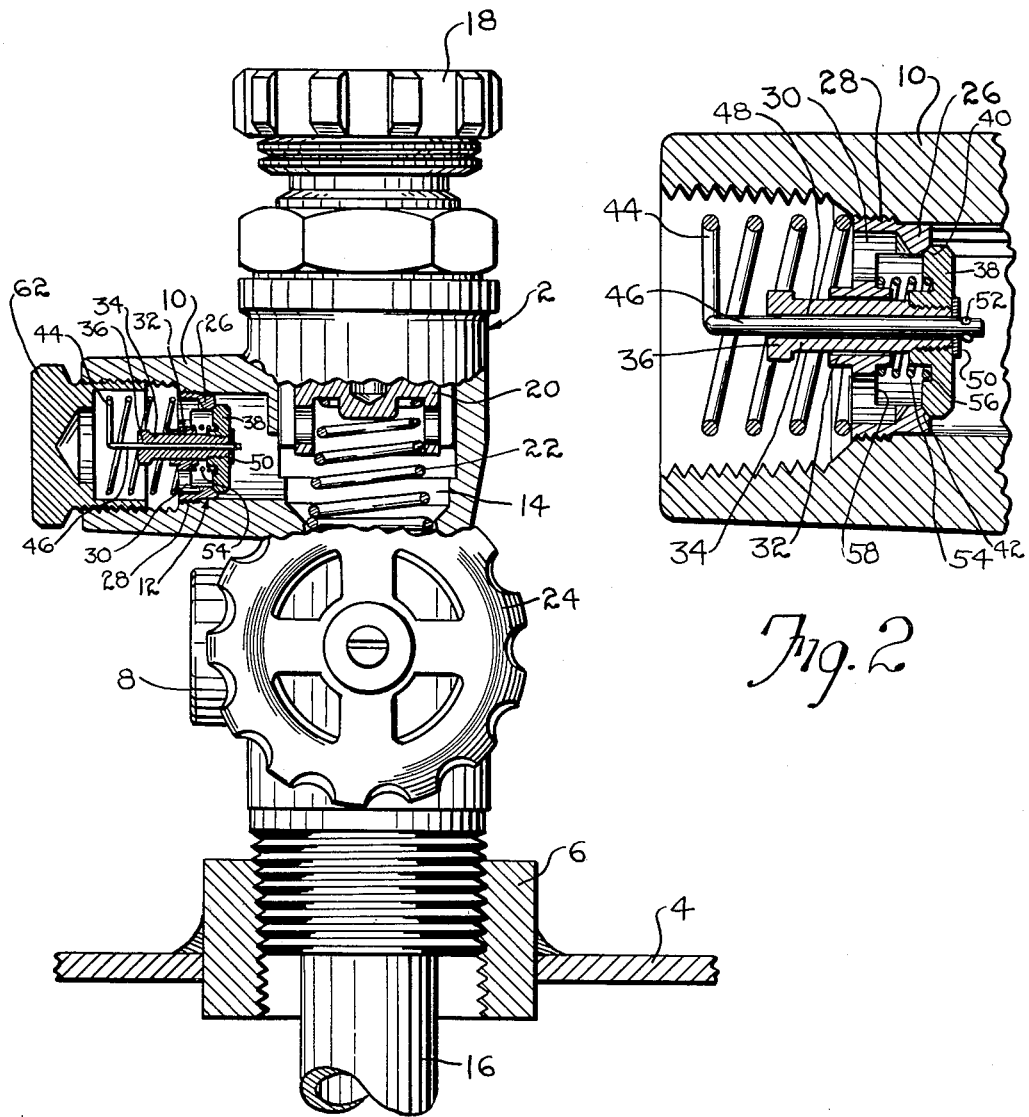
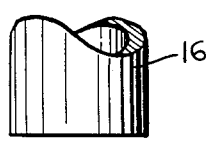
INVENTOR.
Evans R. Billington July 2, 1963
E. R. BILLINGTON
3,095,899
LIQUID OUTAGE CONNECTION
Original Filed May 5, 1958
3 Sheets-Sheet 2
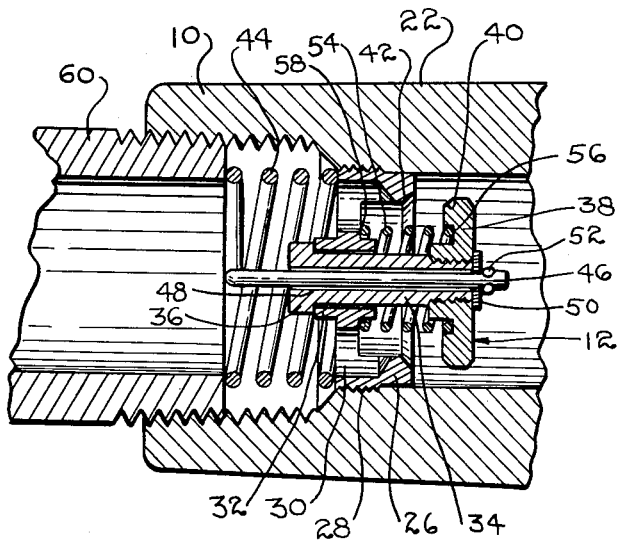
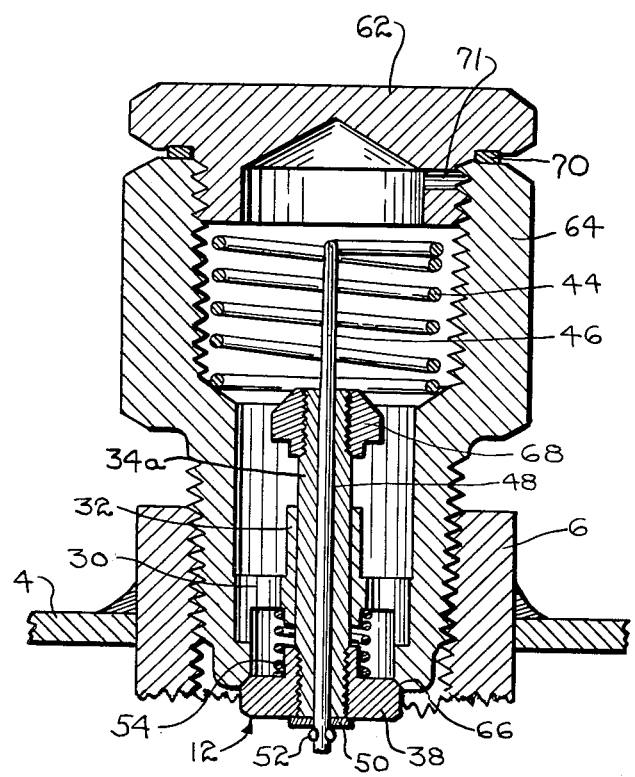
INVENTOR.
Evans R. Billington INVENTOR.
Evans R. Billington 3,095,899
Patented July 2, 1963

1

3,095,899
LIQUID OUTAGE CONNECTION
Evans R. Billington, Chicago, Ill., assignor to The Bastian-Blessing Company, Chicago, Ill., a corporation of Illinois
Continuation of application Ser. No. 733,125, May 5, 1958. This application Mar. 2, 1960, Ser. No. 12,475
31 Claims. (Cl. 137—454.5)

This invention relates to excess flow check valves for use in liquefied petroleum gas equipment, and more particularly to an excess flow check valve adapted for use in a liquid withdrawal outlet of liquid eduction or fill control fittings, or both, that are mounted on storage tanks that receive sensible heat from the ground or atmosphere whereby the vapor pressure developed in the storage tank can be employed for filling the fuel tank of a tractor, or the like, with liquefied petroleum gas in its liquid phase. The present application is a continuation of my copending application U.S. Serial No. 733,125 filed May 5, 1958, now abandoned.

Excess flow check valves are normally used as automatic outflow check or shut-off valves in eduction lines of liquefied petroleum gas dispensing systems as a safety precaution to prevent the escape of gas through the line in the event a break occurs in the line beyond the valve. These valves are generally located at the tank and close in the direction of outflowing gas. Although various types of flow check valves have been employed in the past with domestic installations of liquefied petroleum gas systems, they are subject to the objection that they are not satisfactory for the withdrawal of liquid at rates deemed satisfactory for use in filling the fuel tanks of tractors, or the like. Moreover, any adaptation thereof for that purpose detracts from their use as a safety valve and permits a spilling of the gas in a dangerous and wasteful manner when so used. For example, even though the excess flow check valve is subject to the pressure within the storage container from which liquid is to be withdrawn, it is normally open, and if a coupling joint beyond it is being loosened to make a connection, the bleed at the joint occurring during loosening permits the space beyond the excess flow check valve to be filled with liquid. This liquid expands in all directions when the joint members separate and even more liquid is ejected before the liquid flow closes the excess flow check valve. Then too, there is always the possibility that the valve is cocked or slightly open when closing under such energetic conditions thereby hindering or preventing the making of a connection to the fuel tank to be filled.

Accordingly, it is an object of the present invention to provide an excess flow check valve heaving a particular construction which assures against any excess flow of gas while the coupling is being loosened and thereafter, being already closed prevents accidental discharge of gas from the storage container in which the gas is stored until after the new coupling is being made and then will permit an unobstructed normal high rate of flow of the gas during fuel tank filling operations.

Another object of the invention is to provide an excess flow check valve, as described, which is held against opening prior to the time when connection is made at the outlet thereof either with a manual control valve or other means that serves as the coupling member for the outflow of liquid gas to a tank to be filled, yet will open and remain normally open under operative conditions and pressures existing under normal filling operations from the storage tank to a fuel tank being filled.

Still another object of the invention is to provide bleed passage means in the excess flow check valve having a high drop in pressures across it under potentially high flow conditions when the valve is closed, and a low drop in pressure across it for equalizing pressures when low flow conditions exist to permit full opening of the check valve in use.

A further object of the invention is to provide a means to lock the excess flow check valve on its seat and to vary the distance the valve may move away from its seat.

The invention is also characterized by a shock valve disc which under filling conditions is movable to its closed position with respect to its stem and to its valve seat in double guided relationship thereby yet is positively controlled by said valve stem to maintain a closed position at all other times but without any positive control upon the part of the stem to force the valve disc open.

Another object of the invention is to provide an improved excess flow check valve in which the valve stem is accessible for movement independently of the valve disc and the valve disc is inaccessible yet movable in its closing direction by valve stem movement.

Other objects and advantages of the invention will become apparent as the description proceeds in accordance with the drawings, in which:

FIG. 1 is a side elevational view, partly in vertical section, showing one embodiment of my excess flow check valve mounted on a storage tank and its relationship to a fill and eduction means for the tank;

FIG. 2 is an enlarged view of my excess flow check valve shown in vertical section in FIG. 1;

FIG. 3 is a view similar to FIG. 2 but showing the valve in its open position;

FIG. 4 is a view in vertical section of a second embodiment of my invention in which the excess flow check valve is mounted directly in the wall of a tank;

Figure 5:
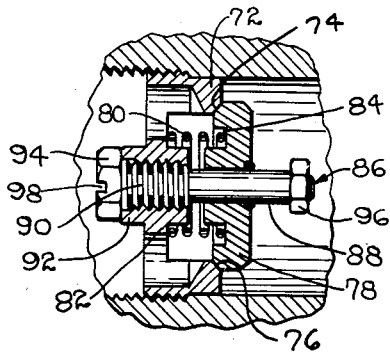
FIG. 5 is a vertical sectional view of a third embodiment of the excess flow check valve of my invention showing the valve in its closed or slugged position.

Reference is hereby made to my co-pending application Serial No. 637,119, now Patent No. 2,909,188 of October 20, 1959 which has been reissued as Reissue No. 25,272 of October 23, 1962, for other embodiments of my invention and the general discussion as to the attributes of my invention. In the application mentioned the check valve and locking relationship is one in which the valve disc and stem move as a unit. In the present invention the arrangement is one essentially in which the valve disc and its valve stem move as independent elements, the valve disc being slidably in guided relation upon the stem and the valve cannot be positively displaced to open position by movement of the stem.

Referring now to the several figures of the drawing, and particularly to the form of the invention shown in FIGS. 1, 2 and 3, a tubular liquid fill and eduction fitting 2 is mounted on a storage tank 4 with which it is in open communication at a point adjacent the bottom through conduit 16. As shown in FIG. 1, the fitting 2 is threaded at its lower end to engage in a threaded opening in the collar 6 that is welded or otherwise rigidly attached to the wall of the tank 4. Also as indicated in FIG. 1, the fitting 2 has two laterally extending hollow bosses 8 and 10, the former of which constitutes an outlet adapted for permanent connection to a service conduit and the latter of which forms the housing and the outlet connection for the excess flow check valve assembly 12 which embodies the invention. Carried by the inner end of the fitting 2 and in fluid communication with the interior of the tank 4 and the main passage 14 is a liquid eduction pipe 16 which as already mentioned extends to a point adjacent the bottom of the tank.

In order to permit the tank to be filled, the main passage 14 is provided with a removable cap 18 at its outer end and an upwardly seating spring pressed valve 20 mounted inwardly of the cap 18 and adapted to be opened by the pressure of the incoming liquid or by the filler pipe which discharges the liquid as more particularly described in Norway 2,361,866. It will be understood that as soon as the inward pressure on the valve is released, it will automatically close under the action of the spring 22. Flow from the tank through the boss 8 is controlled by a valve, not shown, by actuation of the hand wheel 24.

The excess flow check valve comprises a spider-like valve seat member 26 which is threaded into the hollow boss 10 at 28, and is provided with flow passages 30 therethrough and a centrally disposed guide 32 for the valve member 34. The valve member 34 is provided with a stop flange 36 at one end to limit inward movement of the valve by engagement with the guide 32, and has its other end threaded into the valve disc 38 which has its inner face beveled at 40 to engage a correspondingly beveled valve seat at 42 on the valve seat member 26 as more particularly shown in FIGS. 2 and 3. In order to hold the valve 38 normally on its seat, it is provided with a coil spring 44 which bears at its inner end against the valve seat member and has its other end provided with a straight axially extending portion which serves as a valve stem 46 that extends through the coil and is slidable in an axially arranged opening 48 in the valve member 34. The free end of the portion 46 passes through a washer 50 and is secured against removal by deformation at its end as indicated at 52. With this arrangement the valve member and valve disc are free to slide inwardly to open position when the outer end of the spring 44 or stem 46 is displaced inwardly. The valve is normally biased to move away from its seat 26 by a second coil spring 54 of lesser strength than the spring 44. The second spring is confined under compression between the valve disc 38 and the valve seat member 26 with one end thereof located in a groove 56 in the valve disc 38 and the other end bottomed in a groove 58 in the valve seat member 26.

In the normal operation of the valve, the parts will assume the positions shown in FIGS. 1 and 2 with the stronger spring 44 by its stem 46 holding the valve against its seat against the bias of the weaker spring 54. However, when an outlet connection, as for example, a pipe 60 (FIG. 3) is threaded into the threaded discharge opening of the boss 10, it will engage and positively compress the stronger spring 44 and at the same time shift the stem 46 inwardly allowing the weaker spring to move the valve and valve member inwardly a distance limited by the engagement of the flange 36 with the guide 32. In this position of the valve, the pressure on both sides of the valve will become equalized to an extent such that there will be a steady flow out through the pipe 60, but if due to the breakage of the pipe 60 or for some other reason, there would be a sudden drop in pressure on the outlet side of the valve and a consequent rush of liquid through the valve, the valve will compress the weaker spring, the stronger spring still being held in its compressed condition by the end of the pipe 60, and allow the valve to close thus cutting off the flow and preventing waste of or damage by the escaping fluid. When it becomes desirable to disconnect the pipe 60 the valve disc 38 will be pulled shut by the stronger spring before the threaded relationship is broken and any gas in the pipe 60 will bleed out before final severance. In order to close the outlet end of the boss when a conduit such as pipe 60 is not connected thereto a plug 62 is provided, as shown in FIG. 1. On the other hand in making a connection since as shown in FIG. 3, the stem 46 of the spring is smaller than the axial opening 48 in the valve member 34 and the connection between the washer 50 and the end of the spring is not gas tight, the passage 48 will act to reduce the very large pressure differential existing across the valve before an operating connection is made to a safe operating pressure differential at which the valve will open to permit flow.

In the form of the invention shown in FIG. 4, the stop 36 on the valve member is a separate element threaded to the valve member 34a and the fitting is a single opening one comprising a valve housing 64 which carries an integral valve seat 66, and is adapted to be threaded directly into the collar 6 of the tank 4. The springs, valve, valve stem and washer of this form are substantially the same as the corresponding parts in the form of FIGS. 1, 2 and 3 and bear the same reference characters. However, the stop flange 68 on the valve stem is made separate from the stem and then threaded thereon, and a gasket 70 is provided for the cap 62 along with a bleed conduit 71 which vents the compartment before the plug 62 is disengaged. The operation of the valve of this form is substantially the same as that of FIGS. 1, 2 and 3.

Figure 6:
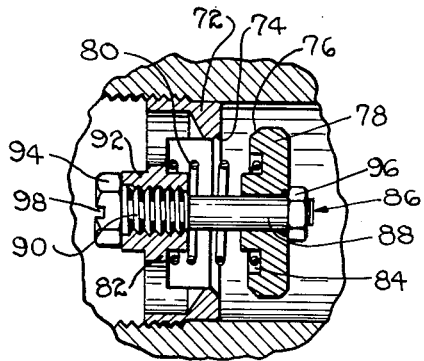
FIG. 6 is a view similar to FIG. 5 but showing the valve in its open position.
Figure 7:
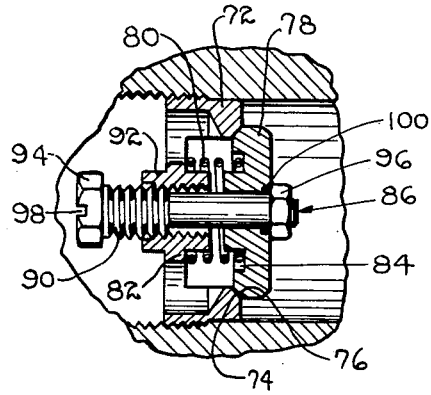
FIG. 7 is a view similar to FIG. 5 but showing the valve locked in its closed position against the expansive force of the spring tending to open it.

Referring now to FIGS. 5, 6 and 7, a somewhat simpler form of valve is illustrated in which the valve stem is threadedly engaged in the spider guide. The valve of this form includes an exteriorly threaded spider-like valve seat member 72 which is adapted to be threaded into any fluid passage, and like the valve seat members of the other forms of the invention is provided with a conical valve seat 74 to receive a similarly shaped face 76 on the valve 78. In order to bias the valve away from its seat, a coil spring 80 is confined between the valve and a shoulder 82 on the valve seat member. As in the other forms of the invention, the valve 78 is provided with a circular groove 84 to receive the inner end of the spring. However, in this form, the valve disc is slidable on the valve member or stem 86 which has an inner smooth portion 88 and an outer threaded portion 90 which is adjustably threaded in a threaded collar 92 on the valve seat member. This threaded connection allows the effective length of the valve stem and the valve head movement to be varied within the limits determined by the enlarged outer end 94 on the valve stem and the nut 96 on the inner end. The outer end 94 is provided with a kerf 98 for engagement with a screw driver or other tool to screw the stem into or out of the collar 92 as desired.

When the valve stem 86 is adjusted to the position shown in FIGS. 5 and 6, the valve may assume either the position of FIG. 5 in which the valve has been moved to its closed position against the action of the spring 80 by a surge or sudden onrush of liquid through the valve, or the position of FIG. 6 in which the valve is urged to its fully open position by the spring when the pressure becomes substantially equalized across the valve. In the position of the valve in FIG. 7, the valve has been locked in closed position against its seat by screwing the stem outwardly and forcing the valve head against the valve seat by compressing the spring. As shown at 100 in FIG. 7, a resilient gasket may be placed around the valve stem 86 between the valve 78 and the stem nut 96 in order to partially seal the joint between the valve and the nut. While the enlarged outer end 94 of the valve stem 86 has been shown as being provided with a kerf to receive a screw driver or similar tool, it will be understood that any other suitable tool-engageable means may be used depending on the type of tool it is desired to use. As in the form of the invention shown in FIGS. 1, 2, 3 and 4, the excess flow check valve of FIGS. 5, 6 and 7 may act as a pressure equalizer by reason of the passage between the valve 78 and the valve stem 86, the cross-section of the stem being less than the cross-sectional area of the opening in the valve through which the stem passes.

Figure 8:
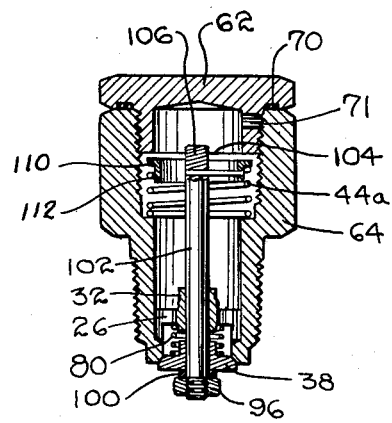
FIG. 8 is a vertical sectional view of a fourth embodiment of the excess flow check valve of my invention showing the valve in its closed or slugged position.
Figure 9:
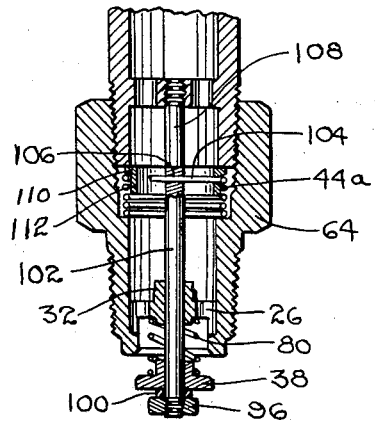
FIG. 9 is a view similar to FIG. 8 but showing the valve in its open position.

Referring now to FIGS. 8 and 9 an arrangement is provided which is quite similar to that shown in FIGS. 1, 2, 3 and 4 in that the valve stem 46 and the valve member 34 are unitary as identified by the numeral 102, same being slidably mounted in the guide 32 of spider-like seat member 26 formed integrally with the housing 64. The valve disc 38 is slidably mounted on the valve stem 102 as described in connection with FIGS. 5 to 7 inclusive by elements including the nut 96 and a sealing gasket 100 for purposes already described.

In this embodiment the end of the spring 44a terminates in a radial direction as at 104 where it is received in an easily assembled relationship in a cross hole 106 in the outer end of the stem 102. With this arrangement, the valve disc can be released from its closed position by an element 108 engaging the outer end of the stem 102 or as shown in said Norway patent and FIG. 3 herein by the inner end of the pipe 60 engaging the outermost turn of the coil spring 44. However, in this latter case, a flanged washer 110 is mounted on the outer end of the spring with the flange 112 thereof received within the end coils and the washer part provided a bearing surface for the end of the pipe 60.

Having thus described the invention and several embodiments thereof, it will be apparent to those skilled in the art how the stated objects are attained and how various and further changes can be made without departing from the spirit of the invention, the scope of which is commensurate with the appended claims.

What is claimed is:

1. An excess flow check valve assembly comprising a pipe having an outlet opening for conveying fluid therethrough, said pipe having a separate valve seat member detachably secured therein, said member having a valve seat thereon, an axially movable element carried by said member accessible through said opening, a valve slidably carried by said movable element and adapted to close against said seat in the direction of fluid flow, spring means biasing said valve away from said seat in a direction opposite to said fluid flow, adjustable means carried by said member for holding said valve in closed position against the force of said spring means and for releasing said spring selectively, said movable member, valve, spring means, seat member and adjustable means being within and accessible through the outlet opening of said pipe and readily removable from said pipe through said outlet opening as a unit.

2. The combination called for in claim 1 including bleed means for said fluid through said valve, and means carried by said movable element to close said bleed means when said valve is in its closed position.

3. An excess flow check valve assembly comprising a pipe for conveying fluid therethrough, said pipe having a separate valve seat member detachably secured therein, said member having a valve seat thereon, an axially movable element carried by said member, a valve slidably carried by said movable element and adapted to close against said seat in the direction of fluid flow, spring means biasing said valve away from said seat in a direction opposite to said fluid flow, adjustable means carried by said member for holding said valve in closed position against the force of said spring means and for releasing said spring means selectively, said movable member, valve, spring means, seat member and adjustable means being readily accessible and removable from said pipe as a unit through an end opening in said pipe in said direction of flow, bleed means for said fluid through said valve, and resilient sealing means between said valve and movable element for closing said bleed means when said valve is carried by said movable element to its closed position.

4. An excess flow check valve assembly comprising a pipe for conveying fluid therethrough, said pipe having a separate valve seat member detachably secured therein, said member having a valve seat thereon, an axially movable element carried by said member, a valve slidably carried by said movable element and adapted to close against said seat in the direction of fluid flow, spring means biasing said valve away from said seat in a direction opposite to said fluid flow, adjustable means carried by said member for holding said valve in closed position against the force of said spring means and for releasing said spring means selectively a variable distance, said movable member, valve, spring means, seat member and adjustable means being readily removable from said pipe as a unit in the direction of fluid flow, said adjustable means comprises a spring whose outer end is secured to said movable element.

5. An excess flow check valve assembly comprising a pipe for conveying fluid therethrough, said pipe having a separate valve seat member detachably secured therein, said member having a valve seat thereon, an axially movable element carried by said member, a valve slidably carried by said movable element and adapted to close against said seat in the direction of fluid flow, spring means biasing said valve away from said seat in a direction opposite to said fluid flow, rotary adjustable means carried by said member for holding said valve in closed position against the force of said spring means and for releasing said spring means selectively, said movable member, valve, spring means, seat member and adjustable means being readily removable from said pipe as a unit in the direction of fluid flow, said adjustable means comprises a compression spring whose coils are guided by the side wall of said valve seat member with its free outer end connected to the outer end of said movable element.

6. An excess flow check valve comprising a housing having a fluid flow passage therethrough open at one end, a valve seat element in said passage having a valve seat adjacent to the other end of said passage, guide means in said passage spaced from said other end, a reciprocable means in said passage accessible for adjustment through said open end extending through said guide means for relative free movements in a valve-closing direction and in a valve opening direction, a stop element on said reciprocable means, a valve member carried by said reciprocable means for movement into and out of engagement with said valve seat, means for moving said reciprocable means and valve member towards said one end to carry the valve member into a closed position, and resilient means released by said moving means for biasing said reciprocable means and said valve member away from said seat a distance limited by said stop element whereby said valve member and resilient means cooperate to perform an excess flow valving action when said valve member is disposed at said limited distance.

7. A lock-type excess flow valve comprising an open-ended hollow tubular body providing a valve seat adjacent its one end, a valve member operatively associated with said valve seat for sealing engagement thereagainst, a valve stem within said body extending from said valve member toward the other open end of said body, retainer means reciprocable within said body, said valve stem being slidably supported by said retainer means for relatively free movement in a valve-closing direction and for limiting retention in a valve-opening direction, first resilient biasing means normally urging said retainer means and valve stem in a valve closing direction, and second resilient biasing means of lesser force than said first biasing means normally urging said valve member in a valve opening direction, said retainer being normally positioned by said first biasing means to effect seating of said valve member against said valve seat, whereby said valve member and second biasing means cooperate to perform an excess flow valving action only upon shifting of said retainer means toward said one end of the body to release said valve stem for free slidable movement.

8. A lock-type excess flow valve comprising an open-ended hollow tubular body providing a valve seat adjacent its one end, a valve member operatively associated with said valve seat for sealing engagement thereagainst, a valve stem within said body extending from said valve member toward the other open end of said body, retainer means reciprocable within said body, said valve stem being slidably supported by said retainer means for relatively free movement in a valve-closing direction and for limiting retention in a valve-opening direction, first resilient biasing means normally urging said retainer means and valve stem in a valve-closing direction, second resilient biasing means of lesser force than said first biasing means normally urging said valve member in a valve-opening direction, said retainer being normally positioned by said first biasing means to effect seating of said valve member against said valve seat, whereby said valve member and second biasing means cooperate to perform an excess flow valving action only upon shifting of said retainer means toward said one end of the body to release said valve stem for free slidable movement, and bleed port means for restricted fluid flow into said valve body when said valve member is in its closed position.

9. A lock-type excess flow valve comprising an open-ended hollow tubular body defining a chamber at one end, a flow communicating bore of relatively smaller cross section at the other end, and an intermediate annular shoulder therebetween, said body defining a valve seat at the outlet opening of said bore, a valve member operative to seal against said valve seat, a valve stem retainer means within said body extending from said valve member toward said chamber and reciprocable within said chamber and slidably supporting the valve member, the end of said retainer means opposite said valve member being slidably supported by said body for relatively free movement in a valve closing direction and for limiting retention in a valve opening direction, first resilient biasing means supported on said shoulder and normally urging said retainer means and valve stem in a valve closing direction, and second resilient biasing means of lesser force than said first biasing means normally urging said valve member in a valve opening direction, said retainer means providing stop means adapted to be engaged by said valve member for limiting sliding movement thereof against the force of said first resilient biasing means, whereby to release said valve member for slidable movement and enable said second biasing means and said valve member to perform an excess valving action.

10. A lock-type excess flow valve comprising an open-ended hollow tubular body providing a valve seat adjacent its one end, a valve member operatively associated with said valve seat for sealing engagement thereagainst, a valve stem within said body extending from said valve member toward the other open end of said body, retainer means reciprocable within said body, said valve stem being slidably supported by said retainer means for relatively free movement in a valve-closing direction and for limiting retention in a valve-opening direction, first resilient biasing means normally urging said retainer means and valve stem in a valve-closing direction, second resilient biasing means of lesser force than said first biasing means normally urging said valve member in a valve-opening direction, said retainer being normally positioned by said first biasing means to effect seating of said valve member against said valve seat, whereby said valve member and second biasing means cooperate to perform an excess flow valving action only upon shifting of said retainer means toward said one end of the body to release said valve stem for free slidable movement, and bleed port means extending through said valve member for restricted fluid flow into said valve body when said valve member is in its closed position.

11. An excess flow check valve comprising a housing having a passage with an outwardly opening internally threaded mouth and a valve seat opening and facing inwardly, spider means in said passage, a valve support means slidably carried by said spider means and extending through said valve seat and having a stop element on the end thereof, a valve disc means slidably mounted on said valve support means ahead of and engaged by said stop element and adapted to close against said valve seat, first means between said spider and valve disc means normally urging the valve disc means away from said valve seat, and means for holding said valve disc means in closed position against the force of the first mentioned means including a resilient element connected to said support means normally urging the stem outwardly to carry the stop against the valve disc means and drive the valve disc means to close against said valve seat, the outer ends of said holding means and support means being disposed in said mouth within the length of said internal thread and accessible from outside of the housing through the mouth for axial displacement inwardly to remove the resilient element from its operation of closing the valve disc means.

12. An excess flow check valve comprising a housing having a fluid flow passage therethrough open at one end and a valve seat member in said passage defining a valve seat thereon opening towards the other end of said housing, a valve carried by said member and adapted to close against said seat and having a bleed passage means for equalizing pressures on opposite sides of the valve, a support guide in said passage, first spring means between said support guide and valve to bias said valve away from said seat, and means including a second spring means for holding said valve in closed position against the biasing force of said first spring means, and annular means axially movable within said fluid flow passage and accessible for actuation solely through said open end for releasing said first spring means selectively to open said valve.

13. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means between said valve element and said spider member for urging said valve element to an open position against said stop element, said operative means moving said valve support means and stop element away from said mouth to release the valve element to the action of said spring means to open it, said valve member including a valve stem slidable in said central opening and having an axially extending passage therethrough receiving said valve support in slidable relationship.

14. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and valve support means accessible solely through said mouth for moving said valve support means and stop element towards said mouth to close the valve element against said valve seat, spring means between said valve element and said spider member for urging said valve element to an open position against said stop element, said operative means moving said valve support means and stop element way from said mouth to release the valve element to the action of said spring means to open it, said operative means between one of the members and the valve support comprising a spring stronger than said spring means and being formed integrally with said valve support.

15. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means between said valve element and said spider member for urging said valve element to an open position against said stop element, said operative means moving said valve support means and stop element away from said mouth to release the valve element to the action of said spring means to open it, said valve support means including a stop means engaging said spider member to limit opening movement of said valve element in a direction away from said mouth.

16. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means between said valve element and said spider member for urging said valve element to an open position against said stop element, said operative means moving said valve support means and stop element away from said mouth to release the valve element to the action of said spring means to open it, said operating means, said valve seat, said spider member, and said valve support means comprising a unitary assembly inserted and removed through said mouth for actuation solely through said mouth.

17. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means directly engaging between said valve element and said spider member for urging said valve element to an open position against said stop element, and means interengaging said pipe end and said operative means for moving said valve support means and stop element away from said mouth to release the valve element to the action of said spring means to open it.

18. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means directly engaging between said valve element and said spider member for urging said valve element to an open position against said stop element, and means interengaging said pipe end and said operative means for moving said valve support means and stop element away from said mouth to release the valve element to the action of said spring means to open it, said operative means between the spider member and valve support means comprising a spring and a spring portion directly engaging said valve support means for urging said valve support means and stop away from said mouth to permit the valve element to open when the spring portion is depressed through said mouth through said interengaging means.

19. An excess flow check valve comprising a housing member having a fluid flow passage therethrough and terminating at one end in an internally threaded mouth for the reception of a threaded pipe end therein, a valve seat element in said passage having a valve seat thereon facing towards the other end of said housing, a spider member in said passage between said mouth and valve seat having a central opening therethrough, a valve support means extending through said central opening and through said valve seat and having a stop element thereon, a valve element slidably mounted on said valve support means for movement between said stop element and said valve seat and including a bleed means for equalizing pressure on opposite sides of the valve element, operative means between one of said members and said valve support means accessible solely through said mouth for moving said valve support means and stop element towards said mouth to close the valve element against said valve seat, spring means directly engaging between said valve element and said spider member for urging said valve element to an open position against said stop element, and means interengaging said pipe end and said operative means for moving said valve support means and stop element away from said mouth to release the valve element to the action of said spring means to open it, said operative means comprising a compression spring whose outer coils are guided by the side walls of the internally threaded mouth, and said interengaging means being carried by said compression spring for engaging said valve support means to establish a compression stress upon said spring for closing said valve element against the effort of said spring means.

20. A lock-type excess flow valve comprising an open-ended hollow tubular body defining a chamber at one end, a flow communicating bore of relatively smaller cross section at the other end, said body defining a valve seat at the outlet opening of said bore, a valve member operative to seal against said valve seat, a retainer stem means reciprocable within said body extending from said valve member toward said chamber and slidable in said bore, means received in said chamber through said opened-end for displacing said retainer means in valve opening direction, the valve member being slidably supported by said retainer stem means for relatively free movement in a valve closing direction and for limiting retention in a valve opening direction, first resilient biasing means normally urging said retainer means and retainer stem means in a valve closing direction, and second resilient biasing means of lesser force than said first biasing means normally urging said valve member in a valve opening direction, whereby said valve member and second biasing means cooperate to perform an excess flow valving action only upon shifting of said retainer stem means inwardly in said bore to release said valve member for said slidable movement.

21. An excess flow check valve comprising a housing having a fluid flow passage therethrough, a valve seat element in said passage having a valve seat spaced from and facing away from the inlet end of said passage, a guide member in said passage between said valve seat and said inlet end and having an opening therethrough, support means axially slidable on said guide member through said opening and extending through said opening and said valve seat and movable coaxially with respect to said valve seat, a stop element on said support means, a valve member slidably carried by said support means between said stop element and valve seat for movement into and out of engagement with said valve seat, first spring means directly between said guide member and valve member for biasing said valve member away from said seat to hold it normally against said stop element, and spring means of greater strength than the first spring means for moving said support means towards said inlet end to carry said stop element and with it the valve member to its closed position against the biasing force of said first spring means.

22. An excess flow check valve comprising a housing having a fluid flow passage therethrough open at one end, a valve seat element in said passage having a valve seat adjacent to the other end of said passage, guide means in said passage spaced from said other end, means accessible for manipulation through said open end and reciprocable in said passage extending through said guide means for relative free movements in a valve-closing direction and in a valve opening direction, a stop element on said reciprocable means, a valve member carried by said reciprocable means for movement into and out of engagement with said valve seat, resilient means for moving said reciprocable means and valve member towards said one end to carry the valve member into a closed position and resilient means of lesser strength within said housing directly engaging between said valve member and guide means released by said moving means for biasing said reciprocable means and said valve member away from said seat a distance limited by said stop element whereby said valve member and resilient means cooperate to perform an excess flow valving action when said valve member is disposed said limited distance.

23. A lock-type excess flow valve comprising an open ended hollow tubular body providing a valve seat adjacent its one end, a valve member operatively associated with said valve seat for sealing engagement thereagainst, retainer stem means reciprocable within said body and extending from said valve member toward the other open end of said body, said valve member being slidably supported by said retainer stem means for relatively free movement in a valve-closing direction and for limiting retention in a valve-opening direction, guide means within said body slidably supporting said retainer stem means, first resilient biasing means normally urging said retainer stem means and valve member in a valve-closing direction, means for urging said valve member in a valve-opening direction including a positive displacement element received within the other end of the tubular body to control the first resilient biasing means and a second resilient biasing means of lesser force than said first biasing means, said retainer stem means being normally positioned by said first biasing means to effect seating of said valve member against said valve seat, whereby said valve member and second biasing means cooperate to perform an excess flow valving action only upon shifting of said retainer stem means toward said one end of the body to release said valve stem for free slidable movement, and stop means provided by said retainer stem means for engagement with said valve member to limit the extent of valve member opening.

24. An excess flow check valve comprising a pipe element, an inlet opening, an outlet opening and having a valve seat therein facing said inlet opening, a member coaxial with said valve seat within said pipe element, a valve element slidably carried by said member and adapted to close against said seat, means biasing said valve away from said seat, and means carried by said member engaging said valve at alternate positions one for holding said valve in closed position against the biasing force of said biasing means and the other for releasing said biasing means and locating said valve at a predetermined excess flow responsive position selectively, said holding means including an element carried by said member adjustably mounted in threaded engagement with said pipe element within the confines of the pipe element and accessible solely through said outlet opening of the pipe element for manipulation.

25. An excess flow check valve comprising a conduit means having an opening at one end and including a spider member, a valve seat and a threaded opening in said conduit means coaxial with said valve seat for access through said opening, valve support means reciprocably supported in said conduit means coaxially with said valve seat, a valve slidably carried by said element and adapted to close against said valve seat, means including a spring and stop means directly engaging the valve and spider member and biasing said valve away from said valve seat to a predetermined excess flow responsive position, and means threaded in said threaded opening for actuating said valve support means for holding said valve in closed position against the biasing force of said spring means and for releasing said valve support means for movement of the valve to said predetermined position.

26. An excess flow check valve comprising a pipe having a valve seat member therein, said member having a valve seat thereon, a valve carried by said member and adapted to close against said seat, spring means directly interengaging said valve and said member and biasing said valve away from said seat, and holding means for holding said valve in closed position against the biasing force of said spring means and for releasing said spring means selectively, said holding means including a threaded opening in said member and a stem member threaded adjacent one end into said opening and slidably mounted in said valve at its other end, a stop on one end of said stem to limit movement of said valve away from said seat and a second stop at the other end of said stem to limit movement of said stem into said threaded opening, said first stop adapted to engage the outer face of said valve and force the same into engagement with said seat as said stem is turned in said threaded opening in valve closing direction and said second stop locating the first stop for limiting opening movement of the valve at a predetermined excess flow responsive position.

27. An excess flow check valve comprising a housing having a passage with an outwardly opening mouth and a valve seat opening and facing inwardly, spider means in said passage, a valve support axially carried by said spider means and extending through said valve seat and having a stop element on the end thereof, a valve disc slidably mounted on said valve support ahead of and limited in its open movement by said stop element and adapted to close against said valve seat, first means normally urging the valve disc to follow said stop away from said valve seat, and second means for releasably holding said valve in closed position against the force of the first means including a rotatable element on said support engaging said spider means and movable in one direction to carry the stop against the valve disc and drive the valve disc to close against said valve seat, the outer ends of said rotatable element and support being disposed in and accessible for manipulation through said mouth from outside of the housing.

28. For use with a tank for storing liquefied gas under pressure, an excess flow check valve comprising a conduit adapted at one end to be secured to said tank in fluid communication, a valve seat member in said conduit having a valve seat thereon facing towards said one end, a valve carried by said member and adapted to close against said seat, first means biasing said valve away from said seat, second means having a stop engaged by said valve at alternate positions one for holding said valve in closed position against the biasing force of said first means and the other for releasing said first means and locating said valve at a predetermined excess flow responsive position selectively, said second means including an elongated element having a valve stop thereon threaded axially through said member and slidably connected to said valve.

29. For use with a tank for storing liquefied petroleum, an excess flow check valve comprising a pipe adapted to be secured at one end in the wall of said tank and in fluid communication with the bottom thereof, a valve seat member in said pipe having a valve seat thereon, a valve carried by said member and adapted to close against said seat, spring means biasing said valve away from said seat, and means accessible through the other end of said pipe for holding said valve in closed position against the biasing force of said first means and for releasing said first means selectively, said second means including a threaded opening in said member and a stem member threaded adjacent one end into said opening and slidably mounted in said valve at its other end, a first stop at one end of said stem engaged by said valve in its open position to limit axial movement of said valve on said stem in one direction, and a second stop on the other end of said stem to limit movement of said stem through said threaded opening in the same direction to locate the first stop to limit said valve to a predetermined excess flow responsive position in its open position.

30. An excess flow valve comprising a housing whose walls define a passage with an outwardly opening internally threaded mouth, a valve seat in the passage opening and facing away from said mouth, guide means in said housing spaced from said seat and having a central opening, a valve member operatively associated with said valve seat for closing engagement thereagainst and having an axially bored valve stem extending through said opening in slidable guided relationship, an elongated retainer reciprocably supported in said passage and having its one end portion adjacent said mouth extending through said axial bore and the valve seat and the other end portion provided with a stop thereon adjustably located a variable distance from the valve seat adapted to engage said valve member to close it against said valve seat, spring means directly interengaging said valve member and said guide means to dispose said valve in its open excess flow responsive position, means received in said passageway supported on the walls of said housing including a stronger spring whose coils are guided thereby engaging said elongated retainer for moving same and the stop thereon in one direction to close the valve member and the opposite direction to permit the spring means to open the valve member, bleed port means through said valve member for equalizing pressures on opposite sides of the valve member, closure means for said bleed port means actuated by said stop means when said stop means moves said valve member to its closed position against said seat means.

31. An excess flow check valve comprising a housing whose walls define a passage with an outwardly opening internally threaded mouth, a valve seat in the passage opening and facing away from said mouth, guide means in said housing spaced from said seat and having a central opening, a valve member operatively associated with said valve seat for closing engagement thereagainst and having a valve stem extending through said opening in slidable guided relationship and having an axial bore therethrough, an elongated retainer reciprocably supported in said passage and having its one end portion adjacent said mouth extending through said bore and said valve seat and the other end portion having a stop thereon adjustably located a variable distance from the valve seat and adapted to engage said valve member to close it, spring means directly interengaging said valve member and said guide means for urging the valve member to an open position, stop means on said stem engaging said guide means to locate said valve at a predetermined excess flow responsive open position, means received in said passageway supported on the walls of said housing engaging said elongated retainer for moving the stop thereon in one direction to close said valve member and in the opposite direction to permit the valve member to open, bleed port means through said valve member for equalizing pressures on opposite sides of the valve member, closure means for said bleed port means actuated by said stop means when said stop means moves said valve member to its closed position against said seat means.

References Cited in the file of this patent

UNITED STATES PATENTS

| | | |
|---|---|---|
| 54,569 | Mallerd | May 8, 1866 |
| 57,087 | Clark | Aug. 14, 1866 |
| 961,590 | England | June 14, 1910 |
| 1,096,220 | Brooks | May 12, 1914 |
| 2,567,426 | Ferrari | Sept. 11, 1951 |
| 2,620,817 | Blaydes | Dec. 9, 1952 |
| 2,632,462 | Selwyn | Mar. 24, 1953 |
| 2,784,561 | Postlewait | Mar. 12, 1957 |
| 2,834,377 | Bragg | May 13, 1958 |

FOREIGN PATENTS

| | | |
|---|---|---|
| 309,335 | Germany | Nov. 18, 1918 |